United States Patent [19]

Witt et al.

[11] Patent Number: 5,498,640

[45] Date of Patent: Mar. 12, 1996

[54] EXPANDABLE THERMOPLASTIC POLYMERS CONTAINING ORGANIC BORON-SILICON COMPOUNDS, AND A PROCESS FOR THEIR PREPARATION

[75] Inventors: Michael Witt, Ludwigshafen; Rolf Henn, Ketsch, both of Germany

[73] Assignee: BASF Aktiengesellschaft, Ludwigshafen, Germany

[21] Appl. No.: 379,527

[22] Filed: Feb. 1, 1995

[30] Foreign Application Priority Data

Sep. 21, 1992 [DE] Germany .............. 42 31 512

[51] Int. Cl.⁶ .................................................. C08J 9/16
[52] U.S. Cl. .................................. 521/59; 52/56; 52/60; 52/149; 52/154
[58] Field of Search .................. 521/56, 59, 60, 521/149, 154

[56] References Cited

FOREIGN PATENT DOCUMENTS

| 3915602 | 11/1990 | Germany . |
| 4137405 | 5/1993 | Germany . |

*Primary Examiner*—Morton Foelak
*Attorney, Agent, or Firm*—Keil & Weinkauf

[57] ABSTRACT

Expandable thermoplastic polymers in particle form comprising a) at least one organic boron-silicon compound, b) at least one thermoplastic polymer and c) a blowing agent, a process for their preparation, and the foams produced using these expandable thermoplastic polymers.

12 Claims, No Drawings

EXPANDABLE THERMOPLASTIC POLYMERS CONTAINING ORGANIC BORON-SILICON COMPOUNDS, AND A PROCESS FOR THEIR PREPARATION

The present invention relates to expandable thermoplastic polymers containing organic boron-silicon compounds, to a process for their preparation, and to the foams produced using these expandable thermoplastic polymers.

Foams having elastic and energy-absorbing properties are required for many applications.

For example, polystyrene foams are rigid. However, it is known from DE-C 39 15 602 that elastic polystyrene foams can be obtained by admixing of from 2 to 50% by weight of a styrene-soluble elastomer.

Foam boards, for example of polyolefin foams or of extruded or particle polystyrene foam, have been used for a long time for heat and sound insulation.

The sound-insulating effectiveness of insulating layers (especially when used under floating screeds) can be quantified by determining the dynamic rigidity s' in accordance with DIN 52 214 and DIN 18 164, Part 2. Small s' values are an indication of good insulation.

For sound insulation, in particular solid-borne sound insulation, preference is given to foam boards that have been elasticized by temporarily compressing them in the direction of the foam boards thickness.

In the known post-treatment of foam boards by compression (also termed elastification), foam boards having a density typically of from 8 to 10 kg/m$^3$ are compressed to a maximum degree of compression of 66%, which is maintained for a specific time (normally less than 60 seconds). The dynamic rigidity values achieved in this way for example with a 25 mm thick foam board of polystyrene particle foam are around 15 N/cm$^3$. By contrast, a corresponding foam board of the same density that has not been elasticized has s' values of $\geq 50$ N/cm$^3$.

It is an object of the present invention to provide a raw material for preparing sound-absorbing foams based on thermoplastic polymers, and also the corresponding foams having sound-absorbing properties. Foam boards produced from these foams must have improved sound insulation without the need for an elasticizing post-treatment by compressing the foam boards.

We have found that surprisingly this object is achieved by using organic boron-silicon compounds.

The present invention thus provides expandable thermoplastic polymers in particle form, comprising a) at least one organic boron-silicon compound, b) at least one thermoplastic polymer, and c) a blowing agent.

The present invention also provides a process for preparing these expandable thermoplastic polymers, wherein at least one organic boron-silicon compound a) and at least one thermoplastic polymer b) are mixed in the melt, the mixture is granulated, and the granules are then impregnated in aqueous suspension with a blowing agent.

The present invention furthermore provides the corresponding expanded thermoplastic polymers in particle form, comprising a) at least one organic boron-silicon compound and b) at least one thermoplastic polymer.

The present invention moreover provides foams having a density of from 0.01 to 0.9 g/cm$^3$, comprising at least one organic boron-silicon compound a) and at least one thermoplastic polymer b).

The expandable or expanded thermoplastic polymers according to the invention and the foams obtained therefrom contain at least one organic boron-silicon compound a).

The organic boron-silicon compound a) is preferably used in an amount of from 0.1 to 50% by weight, particularly preferably in an amount of from 0.5 to 10% by weight, based on the sum of a) and b).

According to the invention, the organic boron-silicon compound used is preferably a boron-siloxane elastomer.

According to the invention particularly suitable boron-siloxane elastomers are for example those marketed by Wacker-Chemie under the name "Hüpfender Kitt (bouncing putty) 29, 36 or 40". The numerical reference refers to the Williams plasticity of the bouncing putty.

This class of substances has previously been used in medical rehabilitation clinics (eg. for restoring hand motor responses by kneading exercises).

The expandable or expanded thermoplastic polymers according to the invention and the foams obtained therefrom contain, in addition to at least one organic boron-silicon compound a), at least one thermoplastic polymer b) as further component.

The thermoplastic polymer b) is preferably used in an amount of from 50 to 99.9% by weight, particularly preferably in an amount of from 90 to 99.5% by weight, based on the sum of a) and b).

Thermoplastic polymers b) are for example polyolefins or polyvinyl aromatic compounds. According to the invention preference is given to polyvinyl aromatic compounds, such as styrene polymers.

For the purposes of the present invention polyolefins are in particular crystalline olefin polymers whose X-ray crystallinity at 25° C. is more than 25%. Suitable polyolefins are for example low density, medium density and high density polyethylenes, for example having a density of from 0.916 to 0.965, preferably from 0.920 to 0.935 g/cm$^3$, such as are prepared by high pressure, low pressure and medium pressure processes, polypropylene, and also ethylene and propylene copolymers containing at least 50 mol % of ethylene and/or propylene units. Suitable comonomers are for example α-alkenes having up to 12 carbon atoms, such as propylene, butene, pentene, hexene and octene, and also vinyl esters such as vinyl acetate, and esters of acrylic acid, methacrylic acid, maleic acid or fumaric acid with alcohols having 1 to 8 carbon atoms. The polyolefins generally have a melt flow index MFI (230; 2.16) (according to DIN 53 735) of from 0.5 to 15, preferably from 1 to 12, and a melting point range of from 100° C. to 170° C. Mixtures of different polyolefins may also be used.

Ethylene-propylene copolymers and copolymers of ethylene, propylene and a $C_4$-$C_8$-α-olefin are preferably used.

Particularly preferred ethylene-propylene copolymers are copolymers comprising from 0.5 to 6% by weight of ethylene and from 94 to 99.5% by weight of propylene.

Particularly preferred copolymers of ethylene, propylene and a $C_4$-$C_8$-α-olefin are copolymers comprising from 0.5 to 6% by weight of ethylene, from 88 to 99% by weight of propylene, and from 0.5 to 6% by weight of a $C_4$-$C_8$-α-olefin, such as 1-butene, 1-pentene, 1-hexene, 1-heptene or 1-octene.

For the purposes of the present invention, styrene polymers are polystyrene and copolymers of styrene with other α,β-olefinically unsaturated compounds that contain at least 50 parts by weight of styrene incorporated by polymerization. Suitable comonomers in the process according to the invention are thus for example α-methyl styrene, ring-halogenated styrenes, ring-alkylated styrenes, acrylonitrile, esters of acrylic or methacrylic acid with alcohols having 1 to 8 carbon atoms, N-vinyl compounds such as vinylcarbazole, or small amounts of compounds containing two polymerizable double bonds, such as butadiene, divinylbenzene or butanediol diacrylate.

The styrene polymers may also contain conventional additions of other substances that impart certain properties to the expandable products. Examples which may be mentioned are flame retardants based on organic bromine or chlorine compounds, such as trisdibromopropyl phosphate, hexabromocyclododecane, chlorinated paraffins, and also synergists for flame retardants, such as dicumyl peroxide and highly decomposable organic peroxides; such substances furthermore include antistatics, stabilizers, dyes, lubricants, fillers and substances having an anti-stick effect during pre-foaming, such as zinc stearate, melamine-formaldehyde condensates or silicic acid, and also agents to reduce the demolding time during foaming, for example glycerol esters or hydroxycarboxylic acid esters.

According to the invention, preferred blowing agents c) are from 1 to 10% by weight, preferably from 3 to 8% by weight, based on the components a) and b), of a $C_3$-$C_9$-hydrocarbon (for example propane, butane, isobutane, n-pentane, i-pentane, neopentane and/or hexane) and/or carbon dioxide.

When carbon dioxide is used as blowing agent or a blowing agent constituent the expandable thermoplastic polymer preferably contains a carbon dioxide absorber, as described in German Patent Application P 41 37 405.3.

The novel expandable thermoplastic polymers in particle form can generally be prepared by mixing the thermoplastic polymer b) with the organic boron-silicon compound a) in the melt, for example in an extruder, and then impregnating the extrudate with a blowing agent.

The impregnation of the extrudate may for example take place in suspension. For this purpose the pellets are dispersed in a suitable suspension agent (for example water), if necessary with the assistance of a suspension stabilizer. The impregnation with a blowing agent then takes place at elevated temperature.

Alternatively the organic boron-silicon compound can be incorporated as early as during the preparation of the thermoplastic polymer. For example, the organic boron-silicon compounds are generally dispersible in styrene and can thus be incorporated by polymerization, with or without the simultaneous presence of the blowing agent. The polymerization conditions should however be chosen so that in particular hydrolyric decomposition of the organic boron-silicon compound a) is minimized.

In a preferred process for preparing the expandable thermoplastic polymers in particle form according to the invention, at least one organic boron-silicon compound a) and at least one thermoplastic polymer b) are mixed in the melt in the extruder, and the mixture is extruded, the extrudate is granulated and the granules are subsequently impregnated in aqueous suspension with a blowing agent.

The expandable or expanded thermoplastic polymers according to the invention are generally converted into foams having a density of from 0.01 to 0.9 g/cm$^3$, comprising at least one organic boron-silicon compound a) and at least one thermoplastic polymer b).

According to the invention the foams may be particle foams or extrudate foams.

Particle foams according to the invention are obtained by introducing expanded (pre-foamed) thermoplastic polymers in particle form, comprising a) at least one organic boron-silicon compound and b) at least one thermoplastic polymer, in a manner known per se into a mold that does not close in a gas-tight manner, and then heating the mold to above the softening point. The particles soften, expand, and weld together to form a molding that corresponds to the shape of the mold interior.

Extrudate foams according to the invention are obtained by mixing at least one organic boron-silicon compound a) and at least one thermoplastic polymer b) together with a blowing agent or blowing agent mixture c) in the melt in an extruder, and then extruding the blowing agent-containing melt with foaming.

According to the invention particle foams are preferred.

The invention has numerous advantages. Foam boards according to the invention in which the plastic polymer is polystyrene have very low values for the dynamic rigidity s', without the need for prior elastification by temporarily compressing the boards together.

EXAMPLES 1 TO 4 AND COMPARATIVE EXAMPLE

Example 1

0.200 kg of Hüpfender Kitt (bouncing putty) 40 (Wacker Chemie) was incorporated into 10,000 kg of commercial thermally polymerizable polystyrene (viscosity number: 75, BASF AG) in a ZSK 30 extruder (extrusion temperature 250° C., throughput 25 kg/hour).

The extrudate was granulated and impregnated in aqueous suspension with n-pentane in a pressure-tight 10 l reactor.

To this end, 48.3 g of solid $Na_4P_2O_7$ were added to 4.5 l of water and dissolved within 10 minutes by stirring. 98.4 g of $MgSO_4 7H_2O$ were then added and the reaction mixture was stirred for a further 10 minutes. 243 g of a 1% strength solution of a mixture of $C_2$-$C_7$ alkanesulfonates comprising predominantly secondary sodium alkanesulfonates having a mean chain length of (Mersolat® K 30 from Bayer AG) and 2.4 kg of the granulate (particle weight from 0.5 to 50 mg) to be impregnated with the blowing agent were then added. The vessel was tightly sealed and the contents were heated from 25° to 100° C. within 4 hours. The contents of the vessel were then heated to 125° C. within 4 hours and left at this temperature for 4 hours. When the internal temperature of the vessel had fallen to 108° C., 192 g of pentane were added.

After the vessel had cooled the contents were filtered, and the blowing agent-containing polymer particles obtained were separated and then pre-foamed in a discontinuous pre-foaming unit (Rauscher) to a bulk density of 15 g/l. The pre-foamed polymer particles were then foamed after storage for 14 hours to give block materials.

After storage for 21 days at room temperature boards were cut from the moldings and their dynamic rigidity was investigated according to DIN 52 214. The results are shown in the table.

Example 2

The same procedure as in Example 1 was adopted, except that only 0.500 kg of bouncing putty was used. The results are given in the table.

Example 3

0.200 kg of Hüpfender Kitt 40 were incorporated into polystyrene (viscosity number 75) as in Example 1, 6% by weight of n-pentane based on the total weight of Hüpfender Kitt 40 and polystyrene already having been added to the extruder. The pre-foaming and production of the moldings took place as in Example 1 (cf. table).

Example 4

The same procedure as in Example 3 was adopted, except that only 0.500 kg of Hüpfender Kitt 40 was used (cf. table).

COMPARATIVE EXAMPLE

The same procedure as in Example 1 was adopted, but without the use of Hüpfender Kitt 40 (cf. table).

TABLE

|  | Molded part density (g/l) | Dynamic rigidity s' (MN/m³) |
|---|---|---|
| Example 1 | 21.3 | 10.95 |
| Example 2 | 19.0 | 10.10 |
| Example 3 | 20.5 | 12.50 |
| Example 4 | 21.5 | 10.20 |
| Comparative Example | 21.0 | 47.00 |

We claim:

1. An expandable thermoplastic polymer in particle form, comprising a) at least one boron-siloxane elastomer, b) at least one thermoplastic polymer, and c) a blowing agent.

2. An expandable thermoplastic polymer as defined in claim 1, wherein the polymer comprises, based on the sum of the components a) and b), from 0.1 to 50% by weight of at least one boron-siloxane elastomer a) and from 50 to 99.9% by weight of at least one thermoplastic polymer b).

3. An expanded thermoplastic polymer in particle form, comprising a) at least one boron-siloxane elastomer and b) at least one thermoplastic polymer.

4. An expandable thermoplastic polymer as defined in claim 1, wherein the thermoplastic polymer b) is polystyrene and/or a styrene copolymer.

5. A process for preparing expandable thermoplastic polymers as defined in claim 1, wherein at least one boron-siloxane elastomer a) and at least one thermoplastic polymer b) are mixed in the melt, the mixture is granulated, and the granules are then impregnated in aqueous suspension with a blowing agent.

6. A foam having a density of from 0.01 to 0.9 g/cm³, comprising at least one boron-siloxane elastomer a) and at least one thermoplastic polymer b).

7. A foam as defined in claim 6, which comprises, based on the sum of the components a) and b), from 0.1 to 50% by weight of at least one boron-siloxane elastomer a) and from 50 to 99.9% by weight of at least one thermoplastic polymer b).

8. A process for preparing foams as defined in claim 6, wherein preexpanded thermoplastic polymers in particle form, comprising a) at least one boron-siloxane elastomer and b) at least one thermoplastic polymer, are welded in a mold at elevated temperature.

9. A process for preparing foams as defined in claim 6, wherein at least one organic boron-silicon compound a) and at least one thermoplastic polymer b) together with a blowing agent or blowing agent mixture c) are mixed in the melt in an extruder, and the blowing agent-containing melt is then extruded with expansion.

10. An expandable thermoplastic polymer as defined in claim 2, wherein the polymer comprises, based on the sum of the components a) and b), from 0.1 to 50% by weight of at least one boron-siloxane elastomer 1) and from 50 to 99.9?% by weight of at least one thermoplastic polymer b).

11. An expanded thermoplastic polymer in particle form as defined in claim 3, wherein the thermoplastic polymer b) is polystyrene and/or a styrene copolymer.

12. An expanded thermoplastic polymer in particle form as defined in claim 11, wherein the polymer comprises, based on the sum of the components a) and b) from 0.1 to 50% by weight of at least one boron-siloxane elastomer 1) and from 50 to 99.9?% by weight of at least one thermoplastic polymer b).

* * * * *

UNITED STATES PATENT AND TRADEMARK OFFICE
CERTIFICATE OF CORRECTION

PATENT NO.: 5,498,640

DATED: March 12, 1996

INVENTOR(S): WITT et al.

It is certified that error appears in the above-identified patent and that said Letters Patent is hereby corrected as shown below:

On the title page, insert the following PCT data:

--[86] PCT No.: PCT/EP 93/02462
    § 371 Date: Feb. 1, 1995
    § 102(e) Date: Feb. 1, 1995

[87] PCT Pub. No.: WO 94/06851
    PCT Pub. Date: Mar. 31, 1994--

Signed and Sealed this

Eleventh Day of June, 1996

*Attest:*

BRUCE LEHMAN

*Attesting Officer*     *Commissioner of Patents and Trademarks*